(12) United States Patent
Inoue

(10) Patent No.: US 9,296,418 B2
(45) Date of Patent: Mar. 29, 2016

(54) VEHICLE CONTROL DEVICE

(71) Applicant: Go Inoue, Gotenba (JP)

(72) Inventor: Go Inoue, Gotenba (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/758,279

(22) PCT Filed: Jan. 23, 2013

(86) PCT No.: PCT/JP2013/051286
§ 371 (c)(1),
(2) Date: Jun. 29, 2015

(87) PCT Pub. No.: WO2014/115262
PCT Pub. Date: Jul. 31, 2014

(65) Prior Publication Data
US 2015/0336607 A1 Nov. 26, 2015

(51) Int. Cl.
*A01B 69/00* (2006.01)
*B62D 6/00* (2006.01)
*B62D 5/04* (2006.01)

(52) U.S. Cl.
CPC .............. *B62D 6/003* (2013.01); *B62D 5/0457* (2013.01)

(58) Field of Classification Search
None
See application file for complete search history.

(56) References Cited

U.S. PATENT DOCUMENTS

| 5,627,756 A * | 5/1997 | Fukada | B60T 8/1755 180/197 |
| 6,091,214 A * | 7/2000 | Yamawaki | B62D 6/008 180/443 |
| 2009/0312909 A1 * | 12/2009 | Onuma | B62D 6/008 701/41 |
| 2011/0264329 A1 | 10/2011 | Limpibunterng et al. | |

FOREIGN PATENT DOCUMENTS

| JP | 2009208682 A | 9/2009 |
| JP | 2010-247585 A | 11/2010 |
| JP | 2011-31770 A | 2/2011 |
| WO | 2010/073400 A1 | 7/2010 |

* cited by examiner

*Primary Examiner* — Adam Alharbi
(74) *Attorney, Agent, or Firm* — Sughrue Mion, PLLC

(57) ABSTRACT

A vehicle control device includes: a travelable region detecting device configured to detect a travelable region of a vehicle; a travel control device configured to execute trajectory control based on a target vehicle behavior amount calculated for the vehicle to travel in the travelable region detected by the travelable region detecting device; and a control device configured to calculate a target lateral position correction amount and a target yaw angle correction amount such that a vehicle response to a steering member of a driver when the trajectory control is executed becomes a predetermined vehicle response and correct the target vehicle behavior amount by using a corrected target lateral position based on the calculated target lateral position correction amount and a corrected target yaw angle based on the calculated target yaw angle correction amount when the trajectory control is executed by the travel control device.

9 Claims, 6 Drawing Sheets

VEHICLE CONTROL DEVICE

CROSS REFERENCE TO RELATED APPLICATIONS

This application is a National Stage of International Application No. PCT/JP2013/051286 filed Jan. 23, 2013, the contents of which are incorporated herein by reference in their entirety.

FIELD

The present invention relates to a vehicle control device.

BACKGROUND

Conventionally, there is technology of performing trajectory control to allow a vehicle to travel along a target trajectory.

For example, Patent Literature 1 discloses technology of executing the trajectory control by calculating a control amount of the trajectory control based on lateral deviation from a target position and, when there is a driver input, changing the control amount (a trajectory following property) in consideration of the driver input. Patent Literature 2 discloses technology of estimating travel resistance based on a steering angle and a vehicle speed and correcting the target trajectory of driving assistance control.

CITATION LIST

Patent Literature

Patent Literature 1: Japanese Laid-open Patent Publication No. 2011-031770
Patent Literature 2: Japanese Laid-open Patent Publication No. 2010-247585

SUMMARY

Technical Problem

In the conventional technology (Patent Literatures 1, 2 and the like), a so-called override state in which the driver operates during the trajectory control is determined based on a magnitude and change amounts of a steering angle, an angular speed, steering torque, the control amount and the like, based on whether signs thereof are the same or different, or based on combination thereof as an override determining method. In the conventional technology, control to stop or gradually reduce the trajectory control, to allow an offset between the target trajectory and an actual trajectory is performed as a process after the override is determined in order to prevent interference between the operation of the driver and the trajectory control.

In the conventional technology, however, when a property is changed in a direction to reduce following control of the trajectory control, for example, as the process after the override is determined, following performance of the trajectory control is reduced, so that disturbance suppression performance for a road surface input, side wind and the like realized by the trajectory control might be insufficient.

In the conventional technology, when the offset between the target trajectory and the actual trajectory is allowed, for example, as the process after the override is determined, the control amount for the trajectory control is not output while the offset is allowed. Therefore, in the conventional technology, in a state in which the offset is allowed, the trajectory control does not act, so that the disturbance suppression performance for the road surface input, the side wind and the like realized by the trajectory control might be insufficient.

Furthermore, in the conventional technology, when a control property is switched before and after the override is determined, a control output is changed in a non-linear manner by the switch of the control before and after the override is determined, so that the driver might feel a sense of discomfort.

That is to say, although the conventional technology secures a so-called override property to make a steering intention of the driver of the vehicle to be easily reflected by limiting the control amount of the trajectory control, this sacrifices a disturbance suppression property by the trajectory control. For example, in the conventional technology, the override property is secured but the disturbance suppression property might be deteriorated when the trajectory control is switched or the following performance is limited as a process at the time of the override. In the conventional technology, when the offset is allowed as the process at the time of the override, for example, the override property is secured but the disturbance suppression property might be lost.

In this manner, in the conventional technology, there is a room for improvement in a point of satisfying both the override property and the disturbance suppression property at the time of the trajectory control.

The present invention is achieved in view of the above-described circumstances and an object thereof is to provide the vehicle control device capable of satisfying both the override property and the disturbance suppression property at the time of the trajectory control.

Solution to Problem

A vehicle control device according to the present invention includes: a travelable region detecting device configured to detect a travelable region of a vehicle; a travel control device configured to execute trajectory control based on a target vehicle behavior amount calculated for the vehicle to travel in the travelable region detected by the travelable region detecting device; and a control device configured to calculate a target lateral position correction amount and a target yaw angle correction amount such that a vehicle response to a steering member of a driver when the trajectory control is executed becomes a predetermined vehicle response based on an operation state to the steering member of the driver and a vehicle state of the vehicle and correct the target vehicle behavior amount by using a corrected target lateral position based on the calculated target lateral position correction amount and a corrected target yaw angle based on the calculated target yaw angle correction amount when the trajectory control is executed by the travel control device.

In the vehicle control device, it is preferable that the control device is configured to make the target yaw angle correction amount relative to the target lateral position correction amount smaller as a vehicle speed of the vehicle included in the vehicle state is higher as compared to a case in which the vehicle speed is lower.

In the vehicle control device, it is preferable that the control device is configured to make the target yaw angle correction amount relative to the target lateral position correction amount smaller as a curve radius of the travelable region detected by the travelable region detecting device is larger as compared to a case in which the curve radius of the travelable region is smaller.

In the vehicle control device, it is preferable that the control device is configured to calculate the target lateral position correction amount and the target yaw angle correction amount by using the operation state and the vehicle state detected when the trajectory control is executed and a predetermined vehicle motion model set in advance so as to realize a vehicle response to the steering member of the driver when the trajectory control is not executed.

Moreover, a vehicle control device according to the present invention includes: a travelable region detecting device configured to detect a travelable region of a vehicle; a travel control device configured to execute trajectory control based on a target vehicle behavior amount calculated for the vehicle to travel in the travelable region detected by the travelable region detecting device; and a control device configured to calculate a target lateral position correction amount or a target yaw angle correction amount such that a vehicle response to a steering member of a driver when the trajectory control is executed becomes a predetermined vehicle response based on an operation state to the steering member of the driver and a vehicle state of the vehicle and correct the target vehicle behavior amount by using a corrected target lateral position based on the calculated target lateral position correction amount or a corrected target yaw angle based on the calculated target yaw angle correction amount when the trajectory control is executed by the travel control device.

Advantageous Effects of Invention

The vehicle control device according to the present invention has an effect of satisfying both the override property and the disturbance suppression property at the time of the trajectory control.

DESCRIPTION OF EMBODIMENTS

An embodiment according to the present invention is hereinafter described in detail with reference to the drawings. Meanwhile, the present invention is not limited by the embodiment. Components in the following embodiment include a component easily replaced by one skilled in the art or a substantially identical component.

Embodiment

Figure 1:
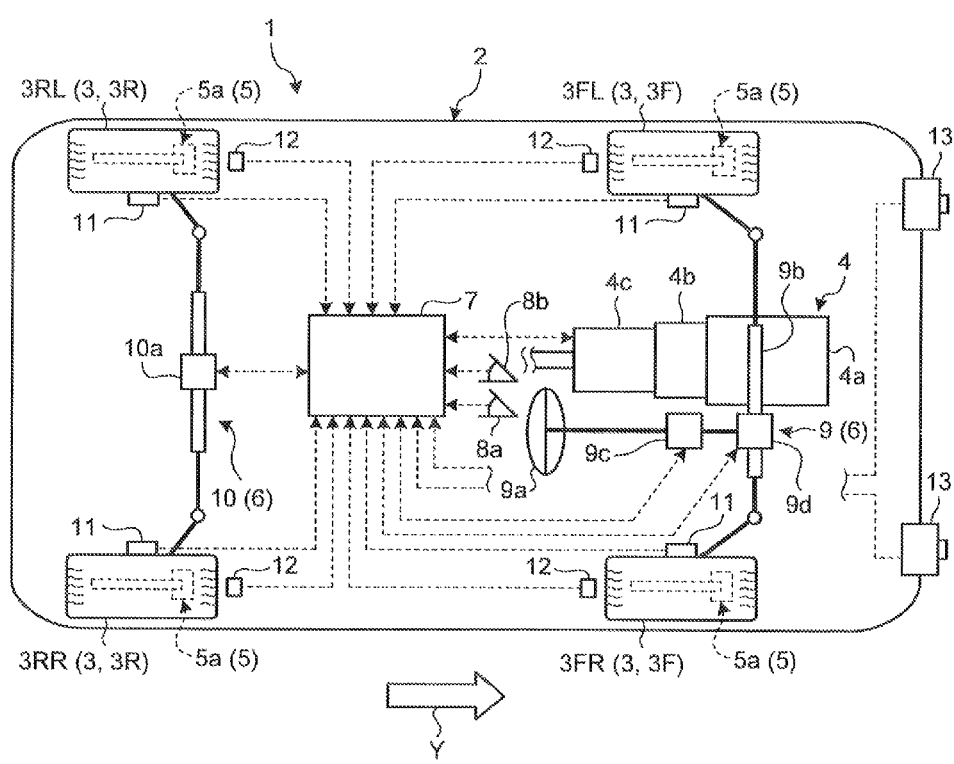
FIG. 1 is a schematic configuration diagram of a vehicle to which a vehicle control device according to an embodiment is applied.

A configuration of a vehicle control device according to this embodiment is described with reference to FIGS. 1 to 9. FIG. 1 is a schematic configuration diagram of a vehicle 2 to which a vehicle control device 1 according to the embodiment is applied.

The vehicle control device 1 of this embodiment is mounted on a four-wheel steering vehicle 2 as illustrated in FIG. 1. Meanwhile, the vehicle 2 herein moves forward in a direction indicated by arrow Y in FIG. 1. The direction in which the vehicle 2 moves forward is a direction from a driver's seat on which a driver of the vehicle 2 sits toward a steering wheel. Right and left sides are defined based on the direction in which the vehicle 2 moves forward (the direction indicated by arrow Y in FIG. 1). That is to say, "left" is intended to mean the left side as seen in the direction in which the vehicle 2 moves forward and "right" is intended to mean the right side as seen in the direction in which the vehicle 2 moves forward. As for front and rear sides of the vehicle 2, a side in the direction in which the vehicle 2 moves forward is the front side and a side in a direction in which the vehicle 2 moves rearward, that is to say, in the direction opposite to the direction in which the vehicle 2 moves forward is the rear side.

The vehicle 2 is provided with a left front wheel (wheel 3 on a left front side) 3FL, a right front wheel (wheel 3 on a right front side) 3FR, a left rear wheel (wheel 3 on a left rear side) 3RL, and a right rear wheel (wheel 3 on a right rear side) 3RR, as the wheels 3. Meanwhile, in the following description, when it is not required to individually describe the left front wheel 3FL, the right front wheel 3FR, the left rear wheel 3RL, and the right rear wheel 3RR, they are sometimes simply referred to as the "wheel 3". In the following description, when it is not required to individually describe the left front wheel 3FL and the right front wheel 3FR, they are sometimes simply referred to as a "front wheel 3F". Similarly, in the following description, when it is not required to individually describe the left rear wheel 3RL and the right rear wheel 3RR, they are sometimes simply referred to as a "rear wheel 3R".

The vehicle control device 1 is equipped with a steering device 6 and the like as an actuator capable of steering the front wheel 3F and the rear wheel 3R of the vehicle 2. The vehicle control device 1 typically optionally controls a vehicle body slip angle attitude with respect to steering in the vehicle 2 provided with the steering device 6 being a four-wheel steering mechanism formed of a front wheel steering device 9, a rear wheel steering device 10 and the like.

Specifically, the vehicle control device 1 is provided with a driving device 4, a braking device 5, the steering device 6, and an electronic control unit (ECU) 7 as a control device as illustrated in FIG. 1.

The driving device 4 forms a power train including a power source 4a, a torque converter 4b, a transmission 4c and the like to realize rotary drive of the wheel 3 being a driving wheel in the vehicle 2. The power source 4a configured to generate rotary power which allows the vehicle 2 to travel is a power source for travel such as an internal-combustion engine (engine) and a motor (rotary machine). The driving device 4 transmits the power generated by the power source 4a from the power source 4a through the torque converter 4b, the transmission 4c and the like to the wheel 3 (for example, the left rear wheel 3RL and the right rear wheel 3RR as the driving wheels). The driving device 4 is electrically connected to the ECU 7 to be controlled by the ECU 7. In the vehicle 2, the driving device 4 generates the power (torque) in response to operation of an accelerator pedal 8a by the driver (accelerator operation) and the power is transmitted to the wheel 3 to generate driving force on the wheel 3.

The braking device 5 generates braking force on the wheel 3 in the vehicle 2. As the braking device 5, a braking unit 5a is provided on each wheel 3. Each braking unit 5a configured to apply the braking force by friction to each wheel 3 of the vehicle 2 is a hydraulic brake device, for example. Each braking unit 5a operates according to a wheel cylinder pressure by brake oil supplied to a wheel cylinder to generate pressure braking force on the wheel 3. In the braking device 5, a master cylinder pressure is applied to the brake oil by a master cylinder in response to operation of a brake pedal 8b by the driver (brake operation). In the braking device 5, a pressure according to the master cylinder pressure or the pressure adjusted by a hydraulic control device acts as the wheel cylinder pressure on each wheel cylinder. In each braking unit 5a, a brake pad supported by a caliper abuts a disk rotor to be pressed against the same by the wheel cylinder pressure, so that an abutment surface between the brake pad and the disk rotor becomes a frictional surface. Each braking unit 5a may apply the braking force by friction to the wheel 3 by predetermined rotational resistance force according to the wheel cylinder pressure acting on the disk rotor rotating together with the wheel 3 by the frictional force generated on the frictional surface.

The steering device 6 capable of steering the front wheel 3F and the rear wheel 3R of the vehicle 2 herein includes the front wheel steering device 9 and the rear wheel steering device 10. The front wheel steering device 9 capable of steering the front wheel 3F of the vehicle 2 steers the left front wheel 3FL and the right front wheel 3FR as steered wheels. The rear wheel steering device 10 capable of steering the rear wheel 3R of the vehicle 2 steers the left rear wheel 3RL and the right rear wheel 3RR as the steered wheels.

Meanwhile, in the following description, the above-described driving device 4, braking device 5, and steering device 6 are sometimes referred to as a travel control device. In this embodiment, the travel control device has a function of executing trajectory control based on a target vehicle behavior amount calculated for the vehicle 2 to travel in a travelable region detected by a front part detecting device 13 to be described later. Herein, the target vehicle behavior amount is intended to mean various parameters which define target vehicle behavior when the vehicle 2 travels along a target trajectory in the travelable region by the trajectory control.

The front wheel steering device 9 is provided with a steering wheel (steering wheel) 9a as a steering member being a steering operator operated by the driver and a turning angle applying mechanism 9b driven in accordance with steering operation of the steering wheel 9a to turn the front wheel 3F. As the turning angle applying mechanism 9b, a so-called rack and pinion mechanism and the like provided with a rack gear and a pinion gear may be used, for example, but the mechanism is not limited thereto. Furthermore, the front wheel steering device 9 includes a variable gear ratio steering (VGRS) device 9c, a steering driver (booster) 9d for front wheel and the like arranged between the steering wheel 9a and the turning angle applying mechanism 9b. The VGRS device 9c is a variable gear ratio steering mechanism capable of changing a gear ratio of the steering wheel 9a. The front wheel steering device 9 may change a turning angle of the front wheel 3F (hereinafter, sometimes referred to as a "front wheel turning angle") with respect to a steering wheel steering angle MA (steering angle) being an operation amount of the steering wheel 9a according to a vehicle state of the vehicle 2 (for example, a vehicle speed V being a travel speed of the vehicle 2) by the VGRS device 9c, for example. The steering driver (steering assist device) 9d is a so-called electric power assist steering (EPS) device which assists steering force applied to the steering wheel 9a by the driver by the power of the motor and the like (steering assist force). The front wheel steering device 9 is electrically connected to the ECU 7 and the VGRS device 9c, the steering driver 9d and the like are controlled by the ECU 7.

The rear wheel steering device 10 is a so-called active rear steering (ARS) device. The rear wheel steering device 10 is provided with a steering driver 10a for rear wheel driven by the power of the motor and the like to turn the rear wheel 3R. The rear wheel steering device 10 may change a turning angle of the rear wheel 3R (hereinafter, sometimes referred to as a "rear wheel turning angle") with respect to the steering wheel steering angle MA according to the vehicle state of the vehicle 2 (for example, the vehicle speed V) by the steering driver 10a, for example, as in the case of the front wheel steering device 9. The rear wheel steering device 10 is electrically connected to the ECU 7 and the steering driver 10a and the like is controlled by the ECU 7. The rear wheel steering device 10 steers the rear wheel 3R in the same phase as the turning angle of the front wheel 3F or in the phase opposite to this according to the vehicle state of the vehicle 2 (for example, the vehicle speed V and a turning state) by the ECU 7, for example.

In the vehicle control device 1, the steering device 6 being the four-wheel steering mechanism is formed of the front wheel steering device 9 and the rear wheel steering device 10 as described above and the left rear wheel 3RL and the right rear wheel 3RR as well as the left front wheel 3FL and the right front wheel 3FR become the steered wheels. The front wheel steering device 9 and the rear wheel steering device 10 may also change the turning angles of the front wheel 3F and the rear wheel 3R irrespective of the steering operation by the driver by control of the ECU 7.

The steering device 6 also is the actuator capable of adjusting a vehicle body slip angle $\beta$ of the vehicle 2. Herein, the vehicle body slip angle $\beta$ is an angle between a center line in a front-rear direction of a vehicle body of the vehicle 2 (a direction of the vehicle body) and a travel direction of the vehicle body of the vehicle 2 (a speed vector), an angle of the center line in the front-rear direction of the vehicle body of the vehicle 2 with respect to a turning tangential line direction of the vehicle 2, for example. In a state in which the center line in the front-rear direction of the vehicle body coincides with the vehicle body travel direction, for example, the vehicle body slip angle $\beta$ is 0 [rad]. The vehicle body slip angle $\beta$ is determined according to a front wheel turning angle $\delta_f$, a rear wheel turning angle $\delta_r$, and the like of the vehicle 2, for example. The steering device 6 may adjust the vehicle body slip angle $\beta$ of the vehicle 2 by adjusting the front wheel turning angle $\delta_f$ and the rear wheel turning angle $\delta_r$.

The ECU 7 being a control device which controls driving of each unit of the vehicle 2 includes an electronic circuit a main body of which is a well-known microcomputer including a CPU, a ROM, a RAM, and an interface. To the ECU 7, various sensors and detectors are electrically connected, for example, and electric signals corresponding to detection results are input. The ECU 7 executes a stored control program based on various input signals input from the various sensors, detectors and the like and various maps, thereby outputting driving signals to respective units of the vehicle 2 such as the driving device 4, the braking device 5, and the steering device 6 to control the driving of them.

The vehicle control device 1 of this embodiment is provided with a wheel speed sensor 11, a wheel cylinder pressure sensor 12, the front part detecting device 13 and the like, for example, as the various sensors and detectors.

A total of four wheel speed sensors 11 are provided for the left front wheel 3FL, the right front wheel 3FR, the left rear wheel 3RL, and the right rear wheel 3RR. Each wheel speed sensor 11 detects a wheel speed being a rotational speed of each of the left front wheel 3FL, the right front wheel 3FR, the left rear wheel 3RL, and the right rear wheel 3RR. The ECU 7 may calculate the vehicle speed V being the travel speed of the vehicle 2 based on the wheel speed of each wheel 3 input from each wheel speed sensor 11.

A total of four wheel cylinder pressure sensors 12 are provided for the braking units 5a of the left front wheel 3FL, the right front wheel 3FR, the left rear wheel 3RL, and the right rear wheel 3RR. Each wheel cylinder sensor 12 detects the wheel cylinder pressure of each braking unit 5a of the left front wheel 3FL, the right front wheel 3FR, the left rear wheel 3RL, and the right rear wheel 3RR.

The front part detecting device 13 detects a situation in front of the vehicle 2 in the travel direction (the direction in the forward movement direction Y). Millimeter wave radar, radar using a laser, infrared radiation and the like, close-range radar such as ultra wide band (UWB) radar, sonar using an audible acoustic wave or an ultrasonic wave, an image recognizing device which detects the situation in front of the vehicle 2 in the travel direction by analyzing image data obtained by imaging an area in front of the vehicle 2 in the travel direction by an imaging device such as a CCD camera and the like may be used, for example, as the front part detecting device 13. Meanwhile, one radar or one camera may be used as the front part detecting device 13. The front part detecting device 13 may detect at least one of presence of a peripheral object (an obstacle, a preceding vehicle and the like) in front of the vehicle 2 in the travel direction, a relative physical amount indicating a relative positional relationship between the detected peripheral object and the vehicle 2, a shape of a road on which the vehicle 2 travels, a travel lane (lane) and the like, for example, as the situation in front of the vehicle 2 in the travel direction. In this embodiment, the front part detecting device 13 serves as a travelable region detecting device which detects the travelable region of the vehicle 2. Herein, the travelable region is intended to mean a certain range in which the traveling vehicle 2 should travel determined based on targets such as a white line drawn along the road, a guardrail, and a reflector, for example, the certain range defined by continuity of the above-described targets. In the following description, the front part detecting device 13 is sometimes referred to as the travelable region detecting device.

An electric signal corresponding to the steering wheel steering angle MA (steering angle) detected by a steering wheel steering angle sensor is input from the VGRS device 9c to the ECU 7. The steering wheel steering angle MA is a steering angle of the steering wheel 9a (a rotational angle of the steering wheel 9a). An electric signal corresponding to the front wheel turning angle $\delta_f$ detected by a front wheel turning angle sensor is input from the steering driver 9d to the ECU 7. The front wheel turning angle $\delta_f$ is the turning angle of the front wheel 3F (a rotational angle of the front wheel 3F). Similarly, an electric signal corresponding to the rear wheel turning angle $\delta_r$ detected by a rear wheel turning angle sensor is input from the steering driver 10a to the ECU 7. The rear wheel turning angle $\delta_r$ is the turning angle of the rear wheel 3R (a rotational angle of the rear wheel 3R).

The ECU 7 controls the front wheel steering device 9 and the rear wheel steering device 10 according to a vehicle body slip angle property of the vehicle 2 set in advance to steer the front wheel 3F and the rear wheel 3R, thereby changing the front wheel turning angle $\delta_f$ and the rear wheel turning angle $\delta_r$, for example. The ECU 7 calculates a target yaw rate and a target vehicle body slip angle based on the steering wheel steering angle MA, the vehicle speed V and the like, for example. The target yaw rate and the target vehicle body slip angle being the target yaw rate and vehicle body slip angle β at the time of steering control of the front wheel steering device 9 and the rear wheel steering device 10 are set to values to stabilize the behavior of the vehicle 2, for example. The ECU 7 calculates a control amount of the front wheel turning angle $\delta_f$ and a control amount of the rear wheel turning angle $\delta_r$ such that the calculated target yaw rate and target vehicle body slip angle may be realized. The ECU 7 performs inverse operation of the control amounts of the front wheel turning angle $\delta_f$ and the rear wheel turning angle $\delta_r$ from the target yaw rate and the target vehicle body slip angle by using a vehicle motion model of the vehicle 2 stored in a storage unit in advance (that is to say, a predetermined vehicle motion model set in advance so as to realize a vehicle response to the steering member of the driver (the steering wheel 9a) when the trajectory control is not executed), for example. The ECU 7 outputs a control command to the front wheel steering device 9 and the rear wheel steering device 10 based on the calculated control amounts of the front wheel turning angle $\delta_f$ and the rear wheel turning angle $\delta_r$. The ECU 7 performs feedback-control of actual front wheel turning angle $\delta_f$ and rear wheel turning angle $\delta_r$ detected by the front wheel turning angle sensor of the steering driver 9d and the rear wheel turning angle sensor of the steering driver 10a and controls the front wheel steering device 9 and the rear wheel steering device 10 such that actual yaw rate and vehicle body slip angle β converge to the target yaw rate and the target vehicle body slip angle. As a result, the vehicle 2 may travel with the front wheel 3F and the rear wheel 3R steered according to a predetermined vehicle body slip angle property by the front wheel steering device 9 and the rear wheel steering device 10.

The ECU 7 may further perform automatic driving control to control the vehicle 2 to perform automatic driving. The ECU 7 may control the vehicle 2 based on the detection result by the front part detecting device 13 to execute the automatic driving control, for example. The automatic driving control is the trajectory control to generate the target trajectory based on the detection result by the front part detecting device 13 and controls the driving device 4, the braking device 5, and the steering device 6 (the front wheel steering device 9 and the rear wheel steering device 10) as the travel control device based on the target vehicle behavior amount for the vehicle 2 to travel along the target trajectory, for example. The ECU 7 generates the target trajectory being a target travel trajectory of the vehicle 2 within the travelable region based on the presence of the peripheral object (the obstacle) in front of the vehicle 2 in the travel direction, the relative physical amount between the peripheral object and the vehicle 2, the shape of the road on which the vehicle 2 travels, the travel lane, the guardrail and the like detected by the front part detecting device 13. The ECU 7 generates the target trajectory of the vehicle 2 according to the travel trajectory which allows the vehicle 2 being an own vehicle to travel within a current travel lane (lane keeping assist), the travel trajectory to avoid the obstacle in front of the vehicle 2 in the travel direction, the travel trajectory to allow the vehicle 2 to follow the preceding vehicle and the like, for example. The ECU 7 controls the driving device 4, the braking device 5, the steering device 6 (the front wheel steering device 9 and the rear wheel steering device 10) as the travel control device based on the target vehicle behavior amount calculated such that the vehicle 2 travels in the travel direction and with the attitude according to the generated target trajectory. In this case, the ECU 7 controls the front wheel steering device 9 and the rear wheel steering device 10 by the control amount of the front wheel turning angle $\delta_f$ (for example, an LKA front wheel correction target angle $\theta_{LK}$, a VGRS normal target angle $\theta_{VG}$ and the like) and the control amount of the rear wheel turning angle $\delta_r$ (for example, an LKA rear wheel correction target angle $\theta_{LKR}$ and the like) as the target vehicle behavior amounts based on an index regarding the generated target trajectory (for example, a target lateral position $Y_{ref}$, a target yaw angle $\psi_{ref}$ and the like of the vehicle 2 with respect to the target trajectory) in addition to the above-described steering wheel steering angle MA and vehicle speed V, for example. As a result, the vehicle 2 may travel along the target trajectory with the front wheel 3F and the rear wheel 3R steered by the trajectory control through the front wheel steering device 9 and the rear wheel steering device 10.

The ECU 7 may also perform the automatic driving control such as auto-cruise travel to automatically control the vehicle speed V at a predetermined vehicle speed, automatic following travel to automatically follow the preceding vehicle with a certain inter-vehicular distance, automatic control of stop and start of the vehicle 2 according to light of traffic lights and a position of a stop line in front in the travel direction and the like, for example. Meanwhile, the vehicle control device 1 may optionally switch on/off the automatic driving control (trajectory control) according to an intention of the driver according to switching operation by the driver through a predetermined selector switch, for example. The selector switch outputs switch information including information to give an instruction to turn on the automatic driving control or information to give an instruction to turn off the automatic driving control to the ECU 7. The selector switch may output the switch information for switching a travel mode (a normal mode, a sport mode or the like) of the vehicle 2 in addition to the switch information for switching on/off the automatic driving control to the ECU 7.

Herein, the vehicle 2 in which the trajectory control is performed desirably reduce interference between a steering intention of the driver and the trajectory control and improve vehicle stability at the time of override in an override state in which the steering operation of the driver is performed during the trajectory control.

Therefore, the vehicle control device 1 of this embodiment improves control performance during the trajectory control and changes the target vehicle behavior amount (for example, the LKA front wheel correction target angle $\theta_{LK}$, the VGRS normal target angle $\theta_{VG}$, the LKA rear wheel correction target angle $\theta_{LKR}$ and the like) referred to at the time of the travel along the target trajectory by the trajectory control according to the steering wheel steering angle MA and the vehicle speed V detected during the trajectory control. For example, the vehicle control device 1 of this embodiment changes the target vehicle behavior amount used at the time of the travel along the target trajectory such that the response to the steering of the driver becomes the response equivalent to the vehicle response when the trajectory control is not performed in a case in which the driver of the vehicle 2 overrides. Furthermore, in the vehicle control device 1 of this embodiment, when the driver of the vehicle 2 overrides, following performance of the trajectory control is not switched as in the conventional technology and an offset is not allowed at that time. That is to say, in the vehicle control device 1 of this embodiment, even when the driver of the vehicle 2 overrides, the trajectory control to the target trajectory realized by the changed target vehicle behavior amount is continued.

According to this, the vehicle control device 1 of this embodiment does not limit the control amount of the trajectory control as in the conventional technology, so that this may secure an override property which allows the steering intention of the driver of the vehicle 2 to be easily reflected without sacrifice of disturbance suppression performance realized by the trajectory control.

Specifically, in this embodiment, the ECU 7 calculates a target lateral position correction amount $G_{yref}(s)$ and a target yaw angle correction amount $G_{\phi ref}(s)$ such that the vehicle response to the steering member of the driver when the trajectory control is executed (LKA time) becomes a predetermined vehicle response based on an operation state to the steering member of the driver (the steering wheel 9a) (for example, the steering wheel steering angle MA) and the vehicle state of the vehicle 2 (for example, the vehicle speed V) when the trajectory control is executed by the travel control device (the driving device 4, the braking device 5, the steering device 6 (the front wheel steering device 9 and the rear wheel steering device 10) and the like). In this embodiment, the predetermined vehicle response includes the vehicle response the same as that of non-LKA time, the vehicle response with a higher gain than that of the non-LKA time (that is to say, with larger vehicle motion), the vehicle response with a lower gain than that of the non-LKA time (that is to say, with smaller vehicle motion), the vehicle response with smaller phase delay than that of the non-LKA time (that is to say, with smaller delay of vehicle motion) and the like, for example, but this is not limited to the above.

As an example, when the predetermined vehicle response is set to the vehicle response the same as that of the non-LKA time, the ECU 7 calculates the target lateral position correction amount $G_{yref}(s)$ and the target yaw angle correction amount $G_{\phi ref}(s)$ such that the vehicle response to the steering member of the driver when the trajectory control is executed (LKA time) becomes equivalent to the vehicle response to the steering member of the driver when the trajectory control is not executed (non-LKA time) based on the operation state to the steering member of the driver (the steering wheel 9a) (for example, the steering wheel steering angle MA) and the vehicle state of the vehicle 2 (for example, the vehicle speed V) when the trajectory control by the travel control device (the driving device 4, the braking device 5, the steering device 6 (the front wheel steering device 9 and the rear wheel steering device 10) and the like) is executed.

The ECU 7 corrects the target vehicle behavior amount (for example, the LKA front wheel correction target angle $\theta_{LK}$, the VGRS normal target angle $\theta_{VG}$, the LKA rear wheel correction target angle $\theta_{LKR}$ and the like) by using a corrected target lateral position $Y_{ref}'$ based on the calculated target lateral position correction amount $G_{yref}(s)$ and a corrected target yaw angle $\Psi_{ref}'$ based on the target yaw angle correction amount $G_{\phi ref}(s)$.

Herein, the ECU 7 may make the target yaw angle correction amount $G_{\phi ref}(s)$ relative to the target lateral position correction amount $G_{yref}(s)$ smaller as the vehicle speed V of the vehicle 2 included in the vehicle state is higher as compared to a case in which the vehicle speed V is lower. The ECU 7 may also make the target yaw angle correction amount $G_{\phi ref}(s)$ relative to the target lateral position correction amount $G_{yref}(S)$ smaller as a curve radius R of the travelable region detected by the travelable region detecting device (front part detecting device 13) is larger as compared to a case in which the curve radius R of the travelable region is smaller.

Meanwhile, the ECU 7 calculates the target lateral position correction amount $G_{yref}(s)$ and the target yaw angle correction amount $G_{\phi ref}(s)$ by using the operation state (for example, the steering wheel steering angle MA) and the vehicle state (for example, the vehicle speed V) detected when the trajectory control is executed and the predetermined vehicle motion model set in advance so as to realize the vehicle response to the steering member of the driver (the steering wheel 9a) when the trajectory control is not executed.

Figure 2:
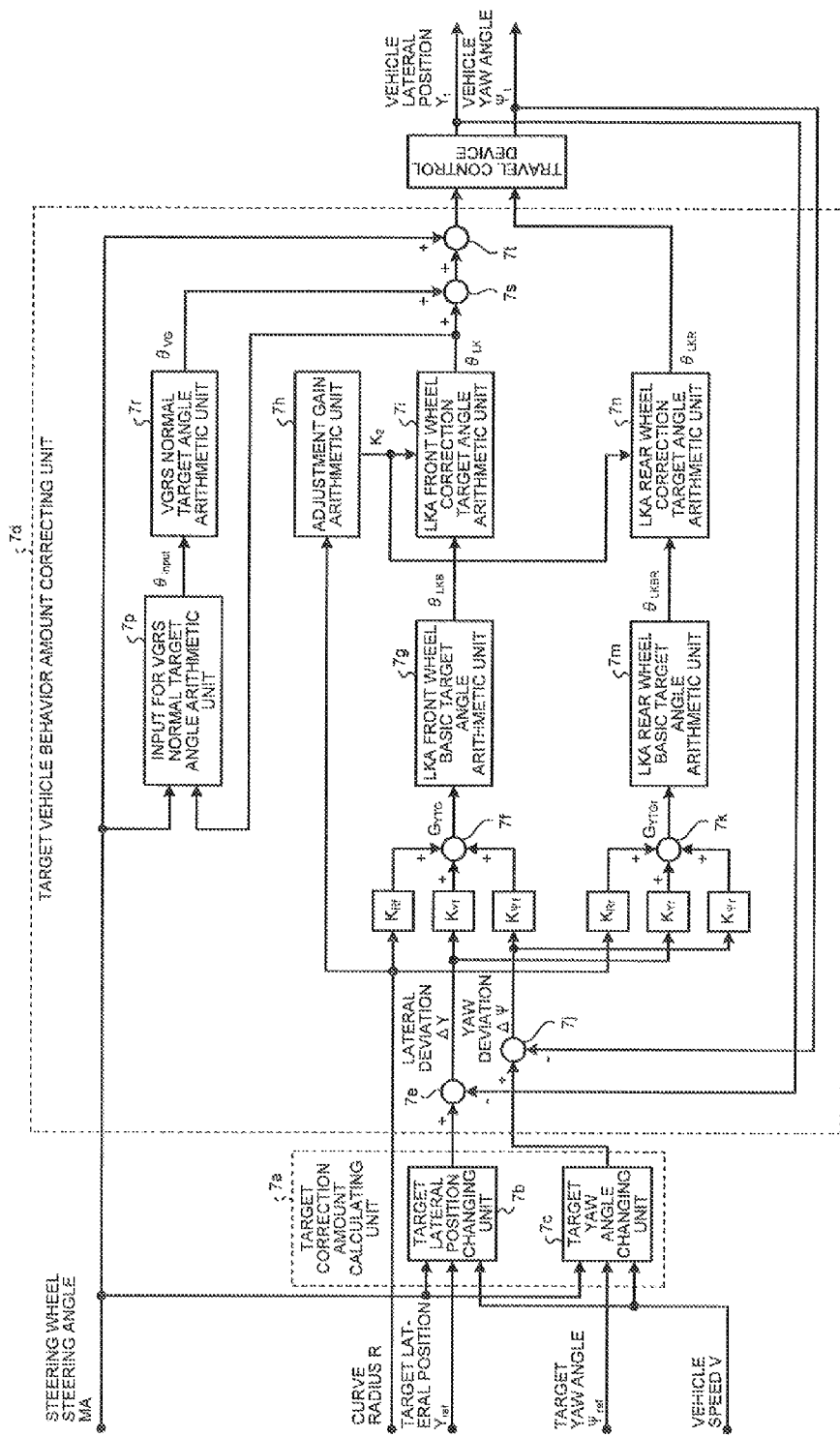
FIG. 2 is a block diagram illustrating an example of a configuration of an ECU of the vehicle control device.

A configuration of the ECU 7 is hereinafter described in detail with reference to FIG. 2. FIG. 2 is a block diagram illustrating an example of the configuration of the ECU 7 of the vehicle control device 1.

As illustrated in FIG. 2, the ECU 7 is roughly provided with a target correction amount calculating unit 7a and a target vehicle behavior amount correcting unit 7d.

The target correction amount calculating unit 7a calculates the target lateral position correction amount $G_{yref}(S)$ and the target yaw angle correction amount $G_{\phi ref}(s)$ based on the operation state to the steering member of the driver (the steering wheel 9a) (for example, the steering wheel steering angle MA) and the vehicle state of the vehicle 2 (for example, the vehicle speed V) when the trajectory control is executed by the travel control device. The target correction amount calculating unit 7a is further provided with a target lateral position changing unit 7b and a target yaw angle changing unit 7c.

Figure 3:
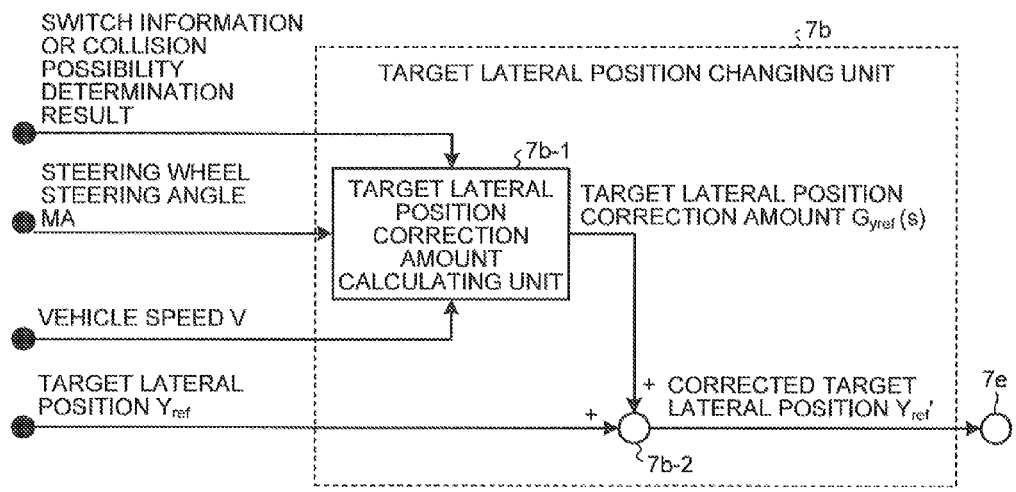
FIG. 3 is a block diagram illustrating a configuration of a target lateral position changing unit in detail.

The target lateral position changing unit 7b is herein described in detail with reference to FIG. 3. FIG. 3 is a block diagram illustrating a configuration of the target lateral position changing unit 7b in detail. As illustrated in FIG. 3, the target lateral position changing unit 7b is further provided with a target lateral position correction amount calculating unit 7b-1 and an adder 7b-2.

Out of them, the target lateral position correction amount calculating unit 7b-1 calculates the target lateral position correction amount $G_{yref}(s)$ by using a predetermined vehicle motion model for calculating the target lateral position correction amount such that the vehicle response to the steering member of the driver when the trajectory control is executed becomes the predetermined vehicle response based on at least the steering wheel steering angle MA detected by the steering wheel steering angle sensor of the vehicle 2 during the trajectory control and the vehicle speed V of the vehicle 2 calculated based on the wheel speed of each wheel 3 detected by each wheel speed sensor 11 during the trajectory control. In this embodiment, the predetermined vehicle motion model includes the one stored in the storage unit in advance set in advance so as to realize the vehicle response to the steering member of the driver (the steering wheel 9a) when the trajectory control is not executed. The predetermined vehicle motion model for calculating the target lateral position correction amount is represented by following equations 1 to 5, for example. In the following equations, model variables V and $V^2$ in parts enclosed by dotted lines represent vehicle speed variable elements varying according to the vehicle speed V. A model variable A represents a stability factor. A model variable $K_f$ represents front wheel cornering power. A model variable $K_r$ represents rear wheel cornering power. A model variable m represents a vehicle weight. A model variable 1 represents vehicle inertia moment.

$$G_{yref}(s) = \frac{1\boxed{V^2}1 + T_{y1}s + T_{y2}s^2}{1 + A\boxed{V^2}L\ s^2\left(1 + \frac{2\zeta s}{\omega_n} + \frac{s^2}{\omega_n^2}\right)} \quad (1)$$

-continued $$T_{y1} = \frac{L_f}{\boxed{V}} \quad (2)$$

$$T_{y2} = \frac{l}{2LK_r} \quad (3)$$

$$\omega_n = \frac{2L}{\boxed{V}}\sqrt{\frac{K_f K_r}{ml}}\sqrt{1 + A\boxed{V^2}} \quad (4)$$

$$\zeta = \frac{m(L_f^2 K_f + L_r^2 K_r) + l(K_f + K_r)}{2L\sqrt{mlK_f K_r(1 + A\boxed{V^2})}} \quad (5)$$

Figure 4:
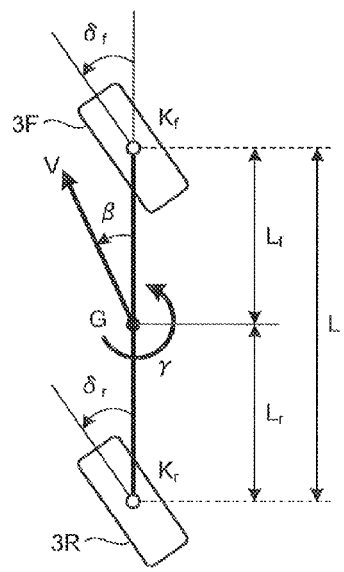
FIG. 4 is a schematic diagram regarding definition of a model variable of a vehicle motion model.

Furthermore, each model variable used in the above-described equations is visually illustrated with reference to FIG. 4. FIG. 4 is a schematic diagram related to definition of the model variables of the vehicle motion model.

In FIG. 4, when the center of gravity G (indicated by a black circle) of the vehicle 2 is conventionally indicated on an axial line connecting ground points of the front and rear wheels (indicated by white circles for both the front and rear wheels), a distance between vehicle center of gravity and front axle $L_f$ and a distance between vehicle center of gravity and rear axle $L_r$ are as illustrated. A distance between front axle and rear axle, that is to say, a wheel base L is represented as $L_f + L_r$. An angle between the axial line connecting the ground points of the front and rear wheels (that is to say, a vehicle front-rear direction tangential line indicating the direction of the vehicle body) and a direction in which the vehicle speed V is generated (that is to say, a speed direction (a direction of the vehicle speed V) of the vehicle 2 indicated by an arrow) is the vehicle body slip angle β. The vehicle body slip angle β is an angle generated by a turn of the vehicle 2 by the yaw moment 1 generated around the center of gravity G by change in rudder angle of the front and rear wheels. A turning direction speed of the center of gravity G is a yaw rate y. When the change in rudder angle is generated on the front and rear wheels, the front wheel cornering power $K_f$ and the rear wheel cornering power $K_r$ are generated on the front and rear wheels, respectively. An angle between the vehicle front-rear direction tangential line and a front-rear direction tangential line of the front wheel 3F is the front wheel rudder angle $\delta_f$. Similarly, an angle between the vehicle front-rear direction tangential line and a front-rear direction tangential line of the rear wheel 3R is the rear wheel rudder angle $\delta_r$.

With reference to FIG. 3 again, the vehicle motion model used by the target lateral position correction amount calculating unit 7b-1 is not limited to that represented by the above-described equations but may be a model which allows the steering intention of the driver of the vehicle 2 to be easily reflected. In addition, in this embodiment, the target lateral position correction amount calculating unit 7b-1 may also calculate the target lateral position correction amount $G_{yref}(s)$ by using predetermined map, gain and the like switchable by the vehicle speed V and the steering wheel steering angle MA in place of the above-described vehicle motion model. Furthermore, the target lateral position correction amount $G_{yref}(s)$ calculated by the target lateral position correction amount calculating unit 7b-1 may also be provided with a guard and the like calculated based on the lane of the road on which the vehicle 2 travels and a vehicle width for avoiding the vehicle 2 from getting outside of the lane.

In addition, the target lateral position correction amount calculating unit 7b-1 may also switch a vehicle property based on the switch information from the selector switch which switches the travel mode of the vehicle 2. For example, the target lateral position correction amount calculating unit 7b-1 may change a property of the target lateral position correction amount $G_{yref}(s)$ or filters (corresponding to equations 1 to 5 described above) according to the switch information from the selector switch. Herein, the elements varying according to the switch information are the stability factor A, the front wheel cornering power $K_f$, and the rear wheel cornering power $K_r$. According to this, the vehicle control device 1 of this embodiment may switch the vehicle response at the time of the override to the normal mode, the sport mode and the like by switching the target lateral position correction amount $G_{yref}(s)$ according to the switch information from the selector switch.

The target lateral position correction amount calculating unit 7b-1 may also switch the vehicle property based on collision possibility determination result from a collision detecting device (not illustrated) which detects collision of the vehicle 2 based on the obstacle located in front of the vehicle 2 in the travel direction and an environment in front thereof in the travel direction. The collision detecting device includes the front part detecting device 13 and a navigation device (not illustrated), for example. For example, the target lateral position correction amount calculating unit 7b-1 may change the property of the target lateral position correction amount $G_{yref}(s)$ or the filters (corresponding to equations 1 to 5 described above) when it is determined that the vehicle 2 highly possibly collides based on the collision possibility determination result from the collision detecting device. Herein, the elements varying according to the collision possibility determination result are the stability factor A, the front wheel cornering power $K_f$, and the rear wheel cornering power $K_r$. According to this, the vehicle control device 1 of this embodiment may improve collision avoidance performance by switching the property of the target lateral position correction amount $G_{yref}(s)$ to that capable of easily avoiding the collision.

Meanwhile, in this embodiment, the override is determined by the technology well known in this technical field based on various pieces of information such as the rudder angle, a rudder angular speed, magnitude of torque, a frequency, and time.

The adder 7b-2 calculates the corrected target lateral position $Y_{ref}'$ by changing the index regarding the target trajectory of the vehicle 2 generated in the travelable region detected by the travelable region detecting device (front part detecting device 13) (the target lateral position $Y_{ref}$ of the vehicle 2 with respect to the target trajectory in FIG. 3) by using the target lateral position correction amount $G_{yref}(s)$ calculated by the target lateral position correction amount calculating unit 7b-1 as described above. The corrected target lateral position $Y_{ref}'$ calculated by the adder 7b-2 is output to an adder/subtracter 7e of the target vehicle behavior amount correcting unit 7d.

Figure 5:
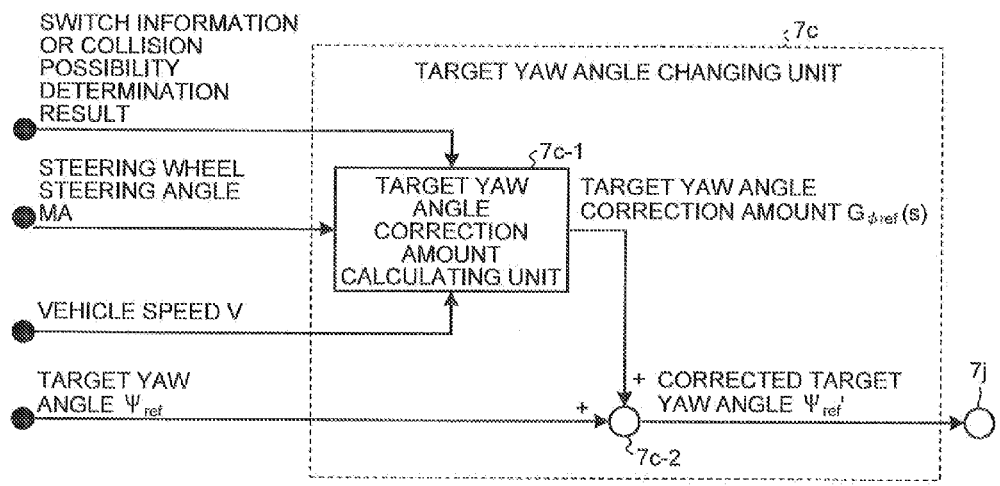
FIG. 5 is a block diagram illustrating a configuration of a target yaw angle changing unit in detail.

The target yaw angle changing unit 7c is herein described in detail with reference to FIG. 5. FIG. 5 is a block diagram illustrating a configuration of the target yaw angle changing unit 7c in detail. As illustrated in FIG. 5, the target yaw angle changing unit 7c is further provided with a target yaw angle correction amount calculating unit 7c-1 and an adder 7c-2.

Out of them, the target yaw angle correction amount calculating unit 7c-1 calculates the target yaw angle correction amount $G_{\varphi ref}(s)$ by using a predetermined vehicle motion model for calculating the target yaw angle correction amount such that the vehicle response to the steering member of the driver when the trajectory control is executed becomes the predetermined vehicle response based on at least the steering wheel steering angle MA detected by the steering wheel steering angle sensor of the vehicle 2 during the trajectory control and the vehicle speed V of the vehicle 2 calculated based on the wheel speed of each wheel 3 detected by each wheel speed sensor 11 during the trajectory control. In this embodiment, the predetermined vehicle motion model for calculating the target yaw angle correction amount is represented by following equations 6 to 9, for example. In the following equations, the model variables V and $V^2$ in parts enclosed by dotted lines represent the vehicle speed variable elements varying according to the vehicle speed V. The description of each model variable is similar to the description of the above-described target lateral position correction amount calculating unit 7b-1, so that this is not repeated.

$$G_{\varphi ref}(s) = \frac{\frac{1}{\boxed{V}} 1 + T_\varphi s}{1 + A\boxed{V^2} L \; s\left(1 + \frac{2\zeta s}{\omega_n} + \frac{s^2}{\omega_n^2}\right)} \quad (6)$$

$$T_\varphi = \frac{mL_f \boxed{V}}{2LK_r} \quad (7)$$

$$\omega_n = \frac{2L}{\boxed{V}} \sqrt{\frac{K_f K_r}{ml}} \sqrt{1 + A\boxed{V^2}} \quad (8)$$

$$\zeta = \frac{m(L_f^2 K_f + L_r^2 K_r) + l(K_f + K_r)}{2L\sqrt{mlK_f K_r (1 + A\boxed{V^2})}} \quad (9)$$

The vehicle motion model used by the target yaw angle correction amount calculating unit 7c-1 is not limited to that represented by the above-described equations and may be a model which allows the steering intention of the driver of the vehicle 2 to be easily reflected as in the case of the vehicle motion model used by the target lateral position correction amount calculating unit 7b-1. In addition, in this embodiment, the target yaw angle correction amount calculating unit 7c-1 may also calculate the target yaw angle correction amount $G_{\varphi ref}(s)$ by using predetermined map, gain and the like switchable by the vehicle speed V and the steering wheel steering angle MA in place of the above-described vehicle motion model. Furthermore, the target yaw angle correction amount $G_{\varphi ref}(s)$ calculated by the target yaw angle correction amount calculating unit 7c-1 may also be provided with a guard and the like calculated based on the lane of the road on which the vehicle 2 travels and the vehicle width for avoiding the vehicle 2 from getting outside of the lane.

In addition, the target yaw angle correction amount calculating unit 7c-1 may also switch the vehicle property based on the switch information from the selector switch which switches the travel mode of the vehicle 2. For example, the target yaw angle correction amount calculating unit 7c-1 may change a property of the target yaw angle correction amount $G_{\varphi ref}(s)$ or filters (corresponding to equations 6 to 9 described above) according to the switch information from the selector switch. Herein, the elements varying according to the switch information are the stability factor A, the front wheel cornering power $K_f$, and the rear wheel cornering power $K_r$. According to this, the vehicle control device 1 of this embodiment may switch the vehicle response at the time of the override to the normal mode, the sport mode and the like by switching the target yaw angle correction amount $G_{ref}(s)$ according to the switch information from the selector switch.

The target yaw angle correction amount calculating unit 7c-1 may also switch the vehicle property based on the collision possibility determination result from the collision detecting device which detects the collision of the vehicle 2 based on the obstacle located in front of the vehicle 2 in the travel direction and the environment in front thereof in the travel direction. For example, the target yaw angle correction amount calculating unit 7c-1 may change the property of the target yaw angle correction amount $G_{\phi ref}(s)$ or the filters (corresponding to equations 6 to 9 described above) when it is determined that the vehicle 2 highly possibly collides based on the collision possibility determination result from the collision detecting device. Herein, the elements varying according to the collision possibility determination result are the stability factor A, the front wheel cornering power $K_f$, and the rear wheel cornering power $K_r$. According to this, the vehicle control device 1 of this embodiment may improve the collision avoidance performance by switching the property of the target yaw angle correction amount $G_{\phi ref}(s)$ to that capable of easily avoiding the collision.

The adder 7c-2 calculates the corrected target yaw angle $\Psi_{ref}'$ by changing the index regarding the target trajectory of the vehicle 2 generated in the travelable region detected by the travelable region detecting device (front part detecting device 13) (the target yaw angle $\Psi_{ref}$ of the vehicle 2 with respect to the target trajectory in FIG. 5) by using the target yaw angle correction amount $G_{\phi ref}(s)$ calculated by the target yaw angle correction amount calculating unit 7c-1 as described above. The corrected target yaw angle $\Psi_{ref}'$ calculated by the adder 7c-2 is output to an adder/subtracter 7j of the target vehicle behavior amount correcting unit 7d.

With reference to FIG. 2 again, the target vehicle behavior amount correcting unit 7d of the ECU 7 is continuously described. The target vehicle behavior amount correcting unit 7d corrects the target vehicle behavior amount (for example, the LKA front wheel correction target angle $\theta_{LK}$, the VGRS normal target angle $\theta_{VG}$, the LKA rear wheel correction target angle $\theta_{LKR}$ and the like) by using the corrected target lateral position $Y_{ref}'$ and the corrected target yaw angle $\Psi_{ref}'$ based on the target lateral position correction amount $G_{yref}(s)$ and the target yaw angle correction amount $G_{\phi ref}(s)$, respectively, calculated by the target correction amount calculating unit 7a.

Herein, the target vehicle behavior amount correcting unit 7d is further provided with the adder/subtracter 7e, an adder 7f, an LKA front wheel basic target angle arithmetic unit 7g, an adjustment gain arithmetic unit 7h, an LKA front wheel correction target angle arithmetic unit 7i, the adder/subtracter 7j, an adder 7k, an LKA rear wheel basic target angle arithmetic unit 7m, an LKA rear wheel correction target angle arithmetic unit 7n, an input for VGRS normal target angle arithmetic unit 7p, a VGRS normal target angle arithmetic unit 7r, an adder 7s, and an adder 7t.

Out of them, the adder/subtracter 7e calculates lateral deviation $\Delta Y$ being deviation between the corrected target lateral position $Y_{ref}'$ calculated by the target lateral position changing unit 7b and a vehicle lateral position $Y_t$ actually detected in the traveling vehicle 2. The adder/subtracter 7e multiplies a gain $K_{Yf}$ by the calculated lateral deviation $\Delta Y$ and outputs the same to the adder 7f. The adder/subtracter 7e multiplies a gain $K_{Yr}$ by the calculated lateral deviation $\Delta Y$ and outputs the same to the adder 7k.

The adder 7f calculates front wheel target lateral acceleration $G_{YTG}$ required to allow the vehicle 2 to follow the target trajectory based on a value obtained by multiplying a gain $K_{Rf}$ by the curve radius R of the target trajectory, a value obtained by multiplying the gain $K_{Yf}$ by the lateral deviation $\Delta Y$ output from the adder/subtracter 7e, and a value obtained by multiplying a gain $K_{\Psi f}$ by yaw deviation $\Delta \Psi$ output from the adder/subtracter 7j to be described later. Herein, the adder 7f may calculate the front wheel target lateral acceleration $G_{YTG}$ according to existing various algorithms or arithmetic expressions. Alternatively, the adder 7f may calculate the front wheel target lateral acceleration $G_{YTG}$ by appropriately selecting a corresponding value from a front wheel target lateral acceleration map in which the above-described curve radius R, lateral deviation $\Delta Y$, and yaw deviation $\Delta \Psi$ are parameters stored in storage means such as a ROM in advance. The adder 7f outputs the calculated front wheel target lateral acceleration $G_{YTG}$ to the LKA front wheel basic target angle arithmetic unit 7g.

The LKA front wheel basic target angle arithmetic unit 7g calculates the LKA front wheel basic target angle $\theta_{LKB}$ based on the front wheel target lateral acceleration $G_{YTG}$ output from the adder 7f. The LKA front wheel basic target angle arithmetic unit 7g outputs the calculated LKA front wheel basic target angle $\theta_{LKB}$ to the LKA front wheel correction target angle arithmetic unit 7i.

Figure 6:
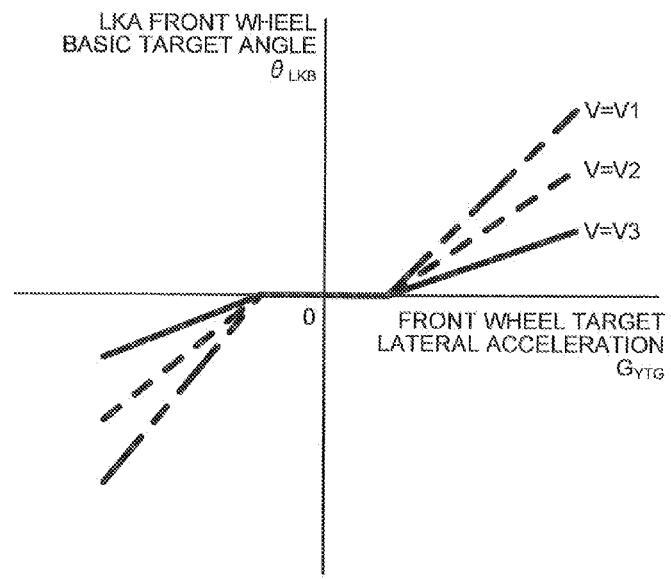
FIG. 6 is a view illustrating a relationship between a front wheel target lateral acceleration $G_{YTG}$ and an LKA front wheel basic target angle $\theta_{LKB}$.

Herein, a relationship between the front wheel target lateral acceleration $G_{YTG}$ and the LKA front wheel basic target angle $\theta_{LKB}$ is described with reference to FIG. 6. FIG. 6 is a view illustrating the relationship between the front wheel target lateral acceleration $G_{YTG}$ and the LKA front wheel basic target angle $\theta_{LKB}$.

In FIG. 6, the LKA front wheel basic target angle $\theta_{LKB}$ is represented along an ordinate axis and the front wheel target lateral acceleration $G_{YTG}$ is represented along an abscissa axis. Herein, the front wheel target lateral acceleration to the left of the vehicle is indicated in a region on a left side of an origin line on which the front wheel target lateral acceleration $G_{YTG}=0$ and the front wheel target lateral acceleration to the right of the vehicle is indicated in a region on a right side in the similar manner. The rudder angle to the right of the vehicle is indicated in a region on an upper side of an origin line on which the LKA front wheel basic target angle $\theta_{LKB}=0$ and the rudder angle to the left of the vehicle is indicated in a region on a lower side in the similar manner. Therefore, the LKA front wheel basic target angle $\theta_{LKB}$ has a property symmetrical with respect to the origin line. The LKA front wheel basic target angle $\theta_{LKB}$ has the property in which an absolute value thereof linearly increases with respect to the front wheel target lateral acceleration $G_{YTG}$ except a dead zone in the vicinity of an area in which the front wheel target lateral acceleration $G_{YTG}=0$.

In FIG. 6, the properties of the LKA front wheel basic target angle $\theta_{LKB}$ with respect to three vehicle speeds V of V1, V2 (V2>V1), and V3 (V3>V2) are indicated by a dashed line, a broken line, and a solid line, respectively. As is clear from the drawing, the LKA front wheel basic target angle $\theta_{LKB}$ is set to be smaller as the vehicle speed V is higher. This is because a degree of generated lateral acceleration with respect to the rudder angle becomes larger as the vehicle speed V is higher.

Meanwhile, an LKA front wheel basic target angle map obtained by digitalizing the relationship illustrated in FIG. 6 is stored in advance in the storage means such as the ROM of the ECU 7 and the LKA front wheel basic target angle arithmetic unit 7g selects a corresponding value from the LKA front wheel basic target angle map.

With reference to FIG. 2 again, each unit of the target vehicle behavior amount correcting unit 7d is continuously described. The adjustment gain arithmetic unit 7h calculates an adjustment gain $K_2$ based on the curve radius R of the target trajectory. The adjustment gain arithmetic unit 7h outputs the calculated adjustment gain $K_2$ to the LKA front wheel correction target angle arithmetic unit 7i and the LKA rear wheel correction target angle arithmetic unit 7n.

Herein, a relationship between the curve radius R and the adjustment gain $K_2$ is described with reference to FIG. 7. FIG.

7 is a view illustrating the relationship between the curve radius R and the adjustment gain $K_2$.

Figure 7:
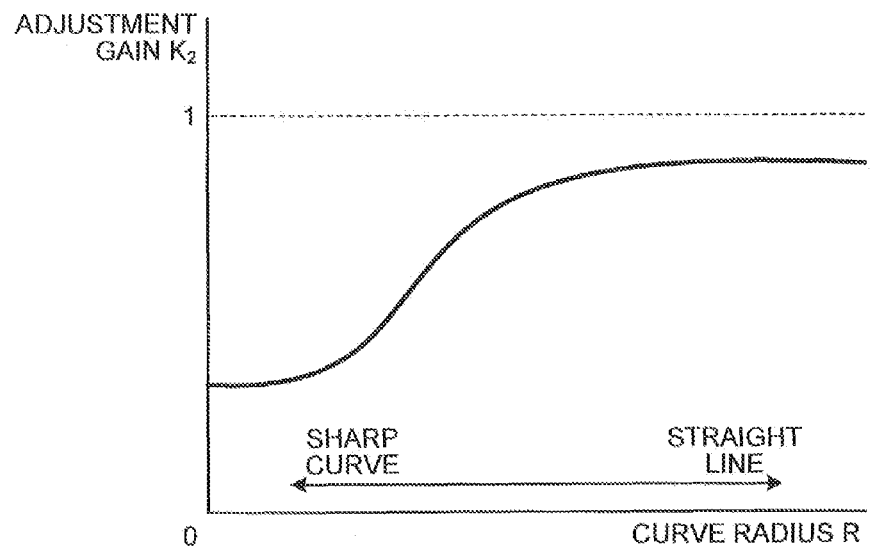
FIG. 7 is a view illustrating a relationship between a curve radius R and an adjustment gain $K_2$.

In FIG. 7, the adjustment gain $K_2$ is represented along an ordinate axis and an absolute value of the curve radius R of the target trajectory is represented along an abscissa axis. Therefore, the target trajectory sharply curves (that is to say, a curve is sharper) as it is closer to a left side in the drawing. As illustrated, the adjustment gain $K_2$ is set in a region smaller than one; this is set to be smaller as the curve radius R is smaller (that is to say, as the curve is sharper). This is because an allowance of the steering of the steering wheel 9a is larger as a curvature of the curve corresponding to the curve radius R is larger (the driver does not feel a sense of discomfort).

Meanwhile, an adjustment gain map obtained by digitalizing the relationship illustrated in FIG. 7 is stored in advance in the storage means such as the ROM of the ECU 7 and the adjustment gain arithmetic unit 7h selects a corresponding value from the adjustment gain map.

With reference to FIG. 2 again, each unit of the target vehicle behavior amount correcting unit 7d is continuously described. The LKA front wheel correction target angle arithmetic unit 7i calculates the LKA front wheel correction target angle $\theta_{LK}$ according to an LKA front wheel correction target angle arithmetic expression "$\theta_{LK}=K_2 \times \theta_{LKB}$" based on the LKA front wheel basic target angle $\theta_{LKB}$ output from the LKA front wheel basic target angle arithmetic unit 7g and the adjustment gain $K_2$ output from the adjustment gain arithmetic unit 7h. When the LKA front wheel correction target angle $\theta_{LK}$ is calculated, the ECU 7 stores the calculated LKA front wheel correction target angle $\theta_{LK}$ in the storage means such as the RAM and a flash memory. The LKA front wheel correction target angle arithmetic unit 7i outputs the calculated LKA front wheel correction target angle $\theta_{LK}$ to the input for VGRS normal target angle arithmetic unit 7p and the adder 7s.

The adder/subtracter 7j calculates the yaw deviation $\Delta\Psi$ being the deviation between the corrected target yaw angle $\Psi_{ref}'$ calculated by the target yaw angle changing unit 7c and a vehicle yaw angle $\Psi_t$ actually detected in the traveling vehicle 2. The adder/subtracter 7j multiplies the gain $K_{\Psi f}$ by the calculated yaw deviation $\Delta\Psi$ and outputs the same to the adder 7f. The adder/subtracter 7j multiplies the gain $K_{\Psi r}$ by the calculated yaw deviation $\Delta\Psi$ and outputs the same to the adder 7k.

The adder 7k calculates rear wheel target lateral acceleration $G_{YTGr}$ required to allow the vehicle 2 to follow the target trajectory based on a value obtained by multiplying a gain $K_{Rr}$ by the curve radius R of the target trajectory in front of the vehicle 2 detected by the front part detecting device 13 (travelable region detecting device), a value obtained by multiplying the gain $K_{Yr}$ by the lateral deviation $\Delta Y$ output from the adder/subtracter 7e, and a value obtained by multiplying the gain $K_{\Psi f}$ by the yaw deviation $\Delta\Psi$ output from the adder/subtracter 7j. Herein, the adder 7k may calculate the rear wheel target lateral acceleration $G_{YTGr}$ according to the existing various algorithms or arithmetic expressions. Alternatively, the adder 7k may calculate the rear wheel target lateral acceleration $G_{YTGr}$ by appropriately selecting a corresponding value from a rear wheel target lateral acceleration map in which the above-described curve radius R, lateral deviation $\Delta Y$, and yaw deviation $\Delta\Psi$ are the parameters stored in the storage means such as the ROM in advance. The adder 7k outputs the calculated rear wheel target lateral acceleration $G_{YTGr}$ to the LKA rear wheel basic target angle arithmetic unit 7m.

The LKA rear wheel basic target angle arithmetic unit 7m calculates an LKA rear wheel basic target angle $\theta_{LKBR}$ based on the rear wheel target lateral acceleration $G_{YTGr}$ output from the adder 7k. The LKA rear wheel basic target angle arithmetic unit 7m outputs the calculated LKA rear wheel basic target angle $\theta_{LKBR}$ to the LKA rear wheel correction target angle arithmetic unit 7n.

Figure 8:
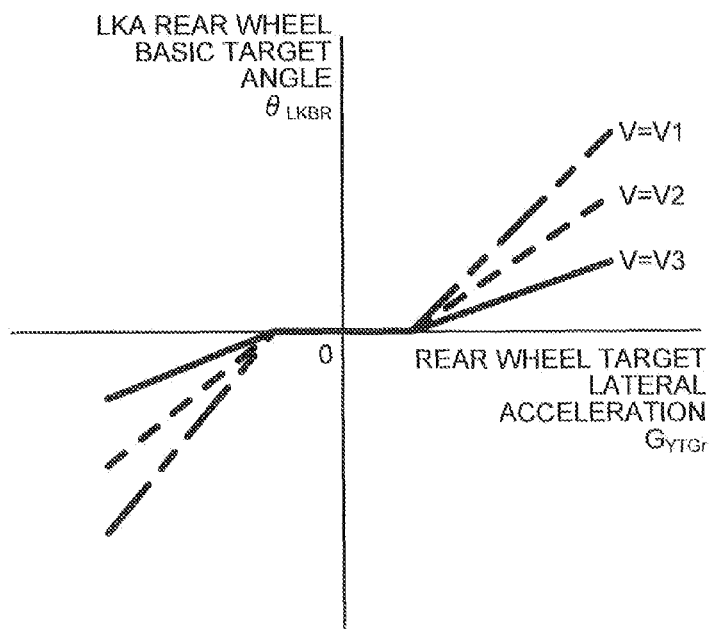
FIG. 8 is a view illustrating a relationship between a rear wheel target lateral acceleration $G_{YTGr}$ and an LKA rear wheel basic target angle $\theta_{LKBR}$.

Herein, a relationship between the rear wheel target lateral acceleration $G_{YTGr}$ and the LKA rear wheel basic target angle $\theta_{LKBR}$ is described with reference to FIG. 8. FIG. 8 is a view illustrating the relationship between the rear wheel target lateral acceleration $G_{YTGr}$ and the LKA rear wheel basic target angle $\theta_{LKBR}$.

In FIG. 8, the LKA rear wheel basic target angle $\theta_{LKBR}$ is represented along an ordinate axis and the rear wheel target lateral acceleration $G_{YTGr}$ is represented along an abscissa axis. Herein, the rear wheel target lateral acceleration to the left of the vehicle is indicated in a region on a left side of an origin line on which the rear wheel target lateral acceleration $G_{YTGr}=0$ and the rear wheel target lateral acceleration to the right of the vehicle is indicated in a region on a right side in the similar manner. The rudder angle to the right of the vehicle is indicated in a region on an upper side of an origin line on which the LKA rear wheel basic target angle $\theta_{LKBR}=0$ and the rudder angle to the left of the vehicle is indicated in a region on a lower side in the similar manner. Therefore, the LKA rear wheel basic target angle $\theta_{LKBR}$ has a property symmetrical with respect to the origin line. The LKA rear wheel basic target angle $\theta_{LKBR}$ has the property in which an absolute value thereof linearly increases with respect to the rear wheel target lateral acceleration $G_{YTGr}$ except a dead zone in the vicinity of an area in which the rear wheel target lateral acceleration $G_{YTGr}=0$.

In FIG. 8, the properties of the LKA rear wheel basic target angle $\theta_{LKBR}$ with respect to the three vehicle speeds V of V1, V2 (V2>V1), and V3 (V3>V2) are indicated by a dashed line, a broken line, and a solid line, respectively. As is clear from the drawing, the LKA rear wheel basic target angle $\theta_{LKBR}$ is set to be smaller as the vehicle speed V is higher. This is because the degree of the generated lateral acceleration with respect to the rudder angle becomes larger as the vehicle speed V is higher.

Meanwhile, an LKA rear wheel basic target angle map obtained by digitalizing the relationship illustrated in FIG. 8 is stored in advance in the storage means such as the ROM of the ECU 7 and the LKA rear wheel basic target angle arithmetic unit 7m selects a corresponding value from the LKA rear wheel basic target angle map.

With reference to FIG. 2 again, each unit of the target vehicle behavior amount correcting unit 7d is continuously described. The LKA rear wheel correction target angle arithmetic unit 7n calculates the LKA rear wheel correction target angle $\theta_{LKR}$ according to an LKA rear wheel correction target angle arithmetic expression "$\theta_{LKR}=K_2 \times \theta_{LKBR}$" based on the LKA rear wheel basic target angle $\theta_{LKBR}$ output from the LKA rear wheel basic target angle arithmetic unit 7m and the adjustment gain $K_2$ output from the adjustment gain arithmetic unit 7h. When the LKA rear wheel correction target angle $\theta_{LKR}$ is calculated, the ECU 7 stores the calculated LKA rear wheel correction target angle $\theta_{LKR}$ in the storage means such as the RAM and the flash memory. The LKA rear wheel correction target angle arithmetic unit 7n outputs the calculated LKA rear wheel correction target angle $\theta_{LKR}$ to the travel control device as the target vehicle behavior amount.

The input for VGRS normal target angle arithmetic unit 7p calculates an input for VGRS normal target angle $\theta_{input}$ based on the operation state to the steering member of the driver (the steering wheel 9a) (for example, the steering wheel steering angle MA) and the LKA front wheel correction target angle $\theta_{LK}$ output from the LKA front wheel correction target angle arithmetic unit 7*i* when the trajectory control is executed by the travel control device. The input for VGRS normal target angle arithmetic unit 7*p* outputs the calculated input for VGRS normal target angle $\theta_{input}$ to the VGRS normal target angle arithmetic unit 7*r*.

Specifically, the input for VGRS normal target angle arithmetic unit 7*p* determines whether an LKA mode is selected as a result of operation of a selector switch for activating LKA control installed in a vehicle interior of the vehicle 2 in advance by the driver and the like. Herein, a reference steering wheel angle during LKA $\theta_{MARef}$ is obtained based on whether the LKA mode is selected. For example, when the LKA mode is selected, the input for VGRS normal target angle arithmetic unit 7*p* calculates the reference steering wheel angle during LKA $\theta_{MARef}$ according to an reference steering wheel angle during LKA arithmetic expression "$\theta_{MARef}=\theta_{LKB}-\theta_{LK}$" based on the LKA front wheel basic target angle $\theta_{LKB}$ calculated by the LKA front wheel basic target angle arithmetic unit 7*g* and the LKA front wheel correction target angle $\theta_{LK}$ output from the LKA front wheel correction target angle arithmetic unit 7*i*. On the other hand, when the LKA mode is not selected, the input for VGRS normal target angle arithmetic unit 7*p* calculates the reference steering wheel angle during LKA $\theta_{MARef}$ according to a reference steering wheel angle during non-LKA arithmetic expression "$\theta_{MARef}=0$". The input for VGRS normal target angle arithmetic unit 7*p* calculates the input for VGRS normal target angle $\theta_{input}$ according to an input for VGRS normal target angle arithmetic expression "$\theta_{input}=MA-\theta_{MARef}$" based on the reference steering wheel angle during LKA $\theta_{MARef}$ calculated in this manner and the steering wheel steering angle MA being a rotational angle of an upper steering shaft.

The VGRS normal target angle arithmetic unit 7*r* calculates the VGRS basic target angle $\theta_{VG}$ being a basic value of a relative rotational angle of a lower steering shaft with respect to the steering wheel steering angle MA being the rotational angle of the upper steering shaft according to a VGRS normal target angle arithmetic expression "$\theta_{VG}=K_1 \times \theta_{input}$" based on the input for VGRS normal target angle $\theta_{input}$ output from the input for VGRS normal target angle arithmetic unit 7*p*. The VGRS normal target angle arithmetic unit 7*r* outputs the calculated VGRS basic target angle $\theta_{VG}$ to the adder 7*s*.

Figure 9:
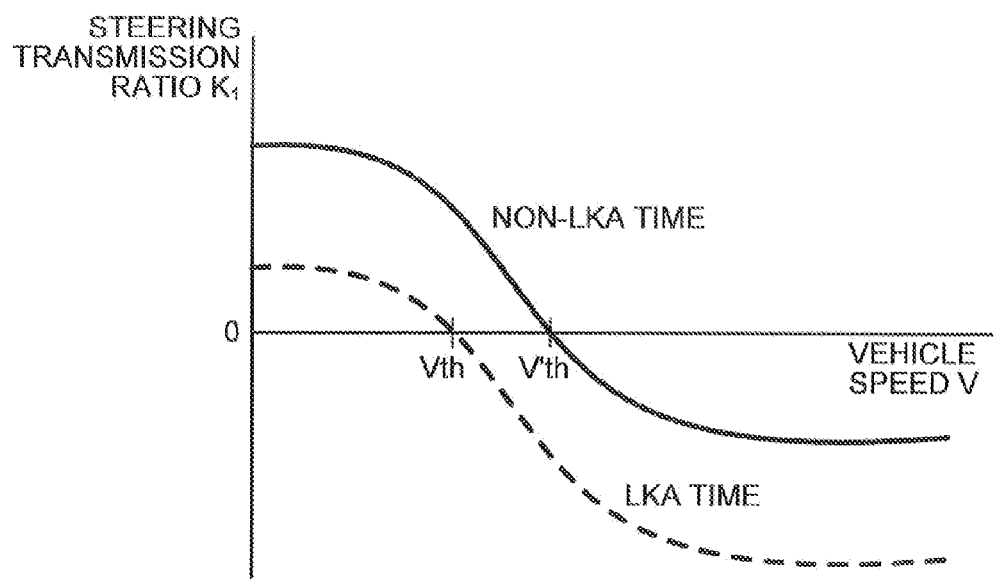
FIG. 9 is a view illustrating a relationship between a steering transmission ratio $K_1$ and a vehicle speed V.

In the above-described VGRS normal target angle arithmetic expression, $K_1$ represents a steering transmission ratio defining the rotational angle of the lower steering shaft with respect to the steering wheel steering angle MA and is a value varying according to the vehicle speed V. Herein, a relationship between the steering transmission ratio $K_1$ and the vehicle speed V is described with reference to FIG. 9. FIG. 9 is a view illustrating the relationship between steering transmission ratio $K_1$ and the vehicle speed V.

As illustrated in FIG. 9, the steering transmission ratio $K_1$ is set to be smaller in all speed ranges when the LKA mode is selected as compared to a case in which the LKA mode is not selected. This is because the target trajectory is automatically followed in the LKA mode, so that damage of travel stability of the vehicle 2 by an effect of disturbance caused by the steering operation of the driver and the like is effectively suppressed. That is to say, in the LKA mode, change in the VGRS basic target angle $\theta_{VG}$ by change in the input for VGRS normal target angle $\theta_{input}$ is smaller as compared to that in a non-LKA mode, so that stable automatic following may be realized.

The steering transmission ratio $K_1$ in the above-described VGRS normal target angle arithmetic expression reaches 0 at a vehicle speed Vth in a middle vehicle speed range (that is to say, a rotational ratio between the upper steering shaft and the lower steering shaft is 1:1), this is larger than 0 at a vehicle speed lower than Vth, and smaller than 0 at a vehicle speed higher than this in the LKA mode. In the case of the non-LKA mode, $K_1$ reaches 0 at a vehicle speed V'th higher than the vehicle speed Vth in the middle vehicle speed range, this is larger than 0 at a vehicle speed lower than V'th, and smaller than 0 at a vehicle speed higher than this. That is to say, $K_1$ is configured such that a larger rudder angle may be obtained with a small steering angle as the vehicle speed is lower regardless of whether the mode is the LKA mode. This is because the lateral acceleration with respect to the rudder angle becomes larger as the vehicle speed is higher as described above.

With reference to FIG. 2 again, each unit of the target vehicle behavior amount correcting unit 7*d* is continuously described. The adder 7*s* outputs a value obtained by adding the LKA front wheel correction target angle $\theta_{LK}$ output from the LKA front wheel correction target angle arithmetic unit 7*i* to the VGRS basic target angle $\theta_{VG}$ output from the VGRS normal target angle arithmetic unit 7*r* to the adder 7*t*.

The adder 7*t* outputs a value obtained by adding the operation state to the steering member of the driver (the steering wheel 9*a*) (for example, the steering wheel steering angle MA) to the value obtained by adding the LKA front wheel correction target angle $\theta_{LK}$ to the VGRS basic target angle $\theta_{VG}$ output from the adder 7*s* to the travel control device as the target vehicle behavior amount when the trajectory control is executed by the travel control device.

The travel control device controls the vehicle 2 to execute the trajectory control based on the target vehicle behavior amount corrected by the target vehicle behavior amount correcting unit 7*d* in this manner.

As described above, the vehicle control device of this embodiment corrects the target vehicle behavior amount for following the target trajectory based on the correction amount of the target lateral position (target lateral trajectory) and the correction amount of the target yaw angle calculated from a steering condition of the driver (the steering wheel steering angle) and the vehicle state (for example, the vehicle speed) when performing the trajectory control based on a vehicle peripheral condition and the like. That is to say, the vehicle control device of this embodiment changes the target vehicle behavior amount for following the target trajectory according to the steering condition of the driver and the vehicle speed such that motion of the vehicle with respect to the steering wheel steering angle becomes the vehicle response set in advance (vehicle response to the steering member of the driver when the trajectory control is not executed in this embodiment). According to this, the vehicle control device of this embodiment may move the vehicle such that the intention of the driver is reflected by appropriately changing the target vehicle behavior amount for following the target trajectory, so that this may secure the override property. Since the override property may be secured, it becomes possible to improve the performance to follow the target trajectory of the trajectory control and also improve disturbance stability brought by the trajectory control. In this manner, the vehicle control device of this embodiment may suppress the sense of discomfort felt by the driver and improve the disturbance suppression performance by correcting the target trajectory from the target lateral position and the target yaw angle.

Specifically, the vehicle control device of this embodiment calculate the target lateral position according to the filters (for example, equations 1 to 5 described above) with coefficient varying according to the vehicle speed and at least one of the rudder angle, the rudder angular speed, and rudder angular acceleration when correcting the target vehicle behavior amount for following the target trajectory. According to this, the vehicle control device of this embodiment may secure a natural vehicle response to the steering by changing the target lateral position for following the target trajectory so as to realize the vehicle response set in advance, so that this may further reduce the sense of discomfort when the driver steers. Herein, it is also possible to further improve arithmetic accuracy of the target lateral position by setting the filters used in this embodiment to quadratic/biquadratic equations.

The vehicle control device of this embodiment changes the target lateral position and the target yaw angle according to the steering condition of the driver and the vehicle speed such that the motion of the vehicle in a lateral direction and in a yaw direction with respect to the steering wheel steering angle becomes the vehicle response set in advance when this is provided with the rear wheel steering device. According to this, the vehicle control device of this embodiment may vary not only the lateral deviation of the vehicle but also the vehicle yaw angle, thereby further reducing the sense of discomfort. In this case, the vehicle control device of this embodiment calculates the target yaw angle according to the filters (for example, equations 6 to 9 described above) with the coefficients varying according to the vehicle speed and at least one of the rudder angle, the rudder angular speed, and the rudder angular acceleration when correcting the target vehicle behavior amount for following the target trajectory. According to this, the vehicle control device of this embodiment may secure the natural vehicle response to the steering also regarding the yaw angle by changing the target yaw angle for following the target trajectory so as to realize the vehicle response set in advance, so that this may further reduce the sense of discomfort when the driver steers. Herein, it is possible to further improve the arithmetic accuracy of the target yaw angle by setting the filters used in this embodiment to linear/cubic equations.

The vehicle control device of this embodiment makes a variation width of the target yaw angle relative to a variation width of the target lateral position smaller as the vehicle speed is higher as compared to a case in which the vehicle speed is lower. According to this, the vehicle control device of this embodiment may suppress the sense of discomfort felt by the driver by performing the trajectory control based on a perception property of the driver changing according to the vehicle speed.

That is to say, the vehicle control device of this embodiment weights the variation widths of the target yaw angle and the target lateral position (that is to say, changes distribution) according to the vehicle speed, so that this may realize the override property with a smaller sense of discomfort by changing the target vehicle behavior amount for following the target trajectory according to the perception property of the driver changing according to the vehicle speed. Specifically, the vehicle control device of this embodiment makes a change amount (absolute value or ratio) of the target yaw angle larger than a change amount of the target lateral position as the vehicle speed is lower, and makes the change amount (absolute value or ratio) of the target lateral position larger than the change amount of the target yaw angle as the vehicle speed is higher. According to this, the vehicle control device of this embodiment may appropriately change the target vehicle behavior amount for following the target trajectory for the perception property of human who perceives the motion of the vehicle by the yaw angle at a low speed and perceives the motion of the vehicle by lateral G at a high speed, so that this may secure the override property with a smaller sense of discomfort.

Furthermore, the vehicle control device of this embodiment makes the variation width of the target yaw angle relative to the variation width of the target lateral position smaller as the curve radius of the target trajectory based on a traveling road of the vehicle is larger as compared to a case in which the curve radius is smaller. According to this, the vehicle control device of this embodiment may suppress the sense of discomfort felt by the driver by performing the trajectory control based on perception property of the driver changing according to the curve radius.

That is to say, the vehicle control device of this embodiment weights the variation widths of the target yaw angle and the target lateral position (that is to say, changes distribution) according to the curve radius of the target trajectory, so that this may realize the override property with a smaller sense of discomfort by changing the target vehicle behavior amount for following the target trajectory according to the perception property of the driver changing according to the curve radius. Specifically, the vehicle control device of this embodiment makes the change amount (absolute value or ratio) of the target yaw angle larger than the change amount of the target lateral position as the curve radius is smaller (for example, during the turn) and makes the change amount (absolute value or ratio) of the target lateral position larger than the change amount of the target yaw angle as the curve radius is larger (for example, during straight travel). According to this, the vehicle control device of this embodiment may appropriately change the target vehicle behavior amount for following the target trajectory for the perception property of human who perceives the motion of the vehicle by the yaw angle during the turn and perceives the motion of the vehicle by the lateral G during the straight travel, so that this may secure the override property with a smaller sense of discomfort.

Although a correcting process of the target vehicle behavior amount executed by the vehicle configuration with the VGRS is described in the above-described embodiment, the vehicle control device of this embodiment is not necessarily provided with the VGRS. In this case, the vehicle control device of this embodiment may correct the target vehicle behavior amount without the processes of the input for VGRS normal target angle arithmetic unit 7p and the VGRS normal target angle arithmetic unit 7r and execute the trajectory control by the travel control device based on the corrected target vehicle behavior amount.

Although the correcting process of the target vehicle behavior amount executed by the vehicle configuration with the four-wheel steering realized by the front wheel steering device 9, the rear wheel steering device 10 and the like is described in the above-described embodiment, the vehicle control device of this embodiment is not necessarily provided with the rear wheel steering device 10. In this case, the vehicle control device of this embodiment may correct the target vehicle behavior amount by the processes of the LKA front wheel basic target angle arithmetic unit 7g and the LKA front wheel correction target angle arithmetic unit 7i regarding the front wheel steering device 9 without the processes of the LKA rear wheel basic target angle arithmetic unit 7m and the LKA rear wheel correction target angle arithmetic unit 7n regarding the rear wheel steering device 10 and execute the trajectory control by the travel control device based on the corrected target vehicle behavior amount.

Although the example of correcting the target vehicle behavior amount by the target vehicle behavior amount correcting unit 7d based on both the correction amount of the target lateral position and the correction amount of the target yaw angle calculated by the target lateral position changing unit 7b and the target yaw angle changing unit 7c of the target correction amount calculating unit 7a is described in the above-described embodiment, the example is not limited to this. The vehicle control device of this embodiment may correct the target vehicle behavior amount by the target vehicle behavior amount correcting unit 7d based on any one of the correction amount of the target lateral position and the correction amount of the target yaw angle calculated by the target lateral position changing unit 7b and the target yaw angle changing unit 7c of the target correction amount calculating unit 7a. That is to say, when the trajectory control is executed by the trajectory control device, the control device may calculate the target lateral position correction amount or the target yaw angle correction amount based on the operation state to the steering member of the driver and the vehicle state of the vehicle and correct the target vehicle behavior amount such that the vehicle response to the steering member of the driver when the trajectory control is executed becomes the vehicle response determined in advance by using the corrected target lateral position based on the calculated target lateral position correction amount or the corrected target yaw angle based on the target yaw angle correction amount.

As described above, the vehicle control device of this embodiment corrects the target vehicle behavior amount for following the target trajectory based on the correction amounts of the target lateral position and/or the target yaw angle calculated such that the vehicle response to the steering member of the driver when the trajectory control is not executed is realized without stopping the trajectory control in the override state in which the steering operation of the driver is performed during the trajectory control. According to this, the vehicle control device of this embodiment may execute the trajectory control by the travel control device based on the target vehicle behavior amount corrected such that the vehicle response when the trajectory control is not executed is realized in the override state in which the steering operation of the driver is performed during the trajectory control.

Herein, the vehicle control device of this embodiment determines whether the situation in front of the traveling vehicle is the situation in which the trajectory control may be executed by the travelable region detecting device when the steering operation of the driver is stopped during the trajectory control (that is to say, when it returns to a non-override state). At that time, the vehicle control device of this embodiment continues the trajectory control based on the target vehicle behavior amount before the override state (that is to say, the target vehicle behavior amount before the correction) when it is the situation in which the trajectory control may be executed.

According to this, the vehicle control device of this embodiment may secure the override property by correction the target vehicle behavior amount such that the vehicle response becomes the predetermined vehicle response and secure the disturbance suppression performance by the trajectory control without stopping the trajectory control when the driver changes the lane or avoids the obstacle by the steering operation during the trajectory control of the vehicle, for example. Furthermore, the vehicle control device of this embodiment continues the trajectory control based on the target vehicle behavior amount before being corrected when it is in the situation in which the trajectory control may be executed even when the lane change and the avoidance of the obstacle are completed (that is to say, it returns to the non-override state), for example, after the trajectory control securing both the override property and the disturbance suppression performance is executed in the override state, so that it becomes possible to continuously secure the disturbance suppression performance by the trajectory control.

REFERENCE SIGNS LIST

1 VEHICLE CONTROL DEVICE
2 VEHICLE
3 WHEEL
4 DRIVING DEVICE (TRAVEL CONTROL DEVICE)
5 BRAKING DEVICE (TRAVEL CONTROL DEVICE)
6 STEERING DEVICE (TRAVEL CONTROL DEVICE)
7 ECU (CONTROL DEVICE)
8a ACCELERATOR PEDAL
8b BRAKE PEDAL
9 FRONT WHEEL STEERING DEVICE
9a STEERING WHEEL
9b TURNING ANGLE APPLYING MECHANISM
9c VGRS DEVICE
9d STEERING DRIVER
10 REAR WHEEL STEERING DEVICE
10a STEERING DRIVER
11 WHEEL SPEED SENSOR
12 WHEEL CYLINDER PRESSURE SENSOR
13 FRONT PART DETECTING DEVICE (TRAVELABLE REGION DETECTING DEVICE)

The invention claimed is:

1. A vehicle control device comprising:
a travelable region detecting device configured to detect a travelable region of a vehicle;
a travel control device configured to execute trajectory control based on a target vehicle behavior amount calculated for the vehicle to travel in the travelable region detected by the travelable region detecting device; and
a control device configured to calculate a target lateral position correction amount and a target yaw angle correction amount such that a vehicle response to a steering member of a driver when the trajectory control is executed becomes a predetermined vehicle response based on an operation state to the steering member of the driver and a vehicle state of the vehicle and correct the target vehicle behavior amount by using a corrected target lateral position based on the calculated target lateral position correction amount and a corrected target yaw angle based on the calculated target yaw angle correction amount when the trajectory control is executed by the travel control device.

2. The vehicle control device according to claim 1, wherein the control device is configured to make the target yaw angle correction amount relative to the target lateral position correction amount smaller as a vehicle speed of the vehicle included in the vehicle state is higher as compared to a case in which the vehicle speed is lower.

3. The vehicle control device according to claim 1, wherein the control device is configured to make the target yaw angle correction amount relative to the target lateral position correction amount smaller as a curve radius of the travelable region detected by the travelable region detecting device is larger as compared to a case in which the curve radius of the travelable region is smaller.

4. The vehicle control device according to claim 1, wherein the control device is configured to calculate the target lateral position correction amount and the target yaw angle correction amount by using the operation state and the vehicle state detected when the trajectory control is executed and a predetermined vehicle motion model set in advance so as to realize a vehicle response to the steering member of the driver when the trajectory control is not executed.

5. A vehicle control device comprising:
a travelable region detecting device configured to detect a travelable region of a vehicle;
a travel control device configured to execute trajectory control based on a target vehicle behavior amount calculated for the vehicle to travel in the travelable region detected by the travelable region detecting device; and
a control device configured to calculate a target lateral position correction amount or a target yaw angle correction amount such that a vehicle response to a steering member of a driver when the trajectory control is executed becomes a predetermined vehicle response based on an operation state to the steering member of the driver and a vehicle state of the vehicle and correct the target vehicle behavior amount by using a corrected target lateral position based on the calculated target lateral position correction amount or a corrected target yaw angle based on the calculated target yaw angle correction amount when the trajectory control is executed by the travel control device.

6. The vehicle control device according to claim 2, wherein the control device is configured to make the target yaw angle correction amount relative to the target lateral position correction amount smaller as a curve radius of the travelable region detected by the travelable region detecting device is larger as compared to a case in which the curve radius of the travelable region is smaller.

7. The vehicle control device according to claim 2, wherein the control device is configured to calculate the target lateral position correction amount and the target yaw angle correction amount by using the operation state and the vehicle state detected when the trajectory control is executed and a predetermined vehicle motion model set in advance so as to realize a vehicle response to the steering member of the driver when the trajectory control is not executed.

8. The vehicle control device according to claim 3, wherein the control device is configured to calculate the target lateral position correction amount and the target yaw angle correction amount by using the operation state and the vehicle state detected when the trajectory control is executed and a predetermined vehicle motion model set in advance so as to realize a vehicle response to the steering member of the driver when the trajectory control is not executed.

9. The vehicle control device according to claim 6, wherein the control device is configured to calculate the target lateral position correction amount and the target yaw angle correction amount by using the operation state and the vehicle state detected when the trajectory control is executed and a predetermined vehicle motion model set in advance so as to realize a vehicle response to the steering member of the driver when the trajectory control is not executed.

* * * * *